Feb. 16, 1932.  F. E. LOCKYEAR  1,845,505
DOUBLE DISK BRAKE
Filed May 28, 1930  2 Sheets-Sheet 1
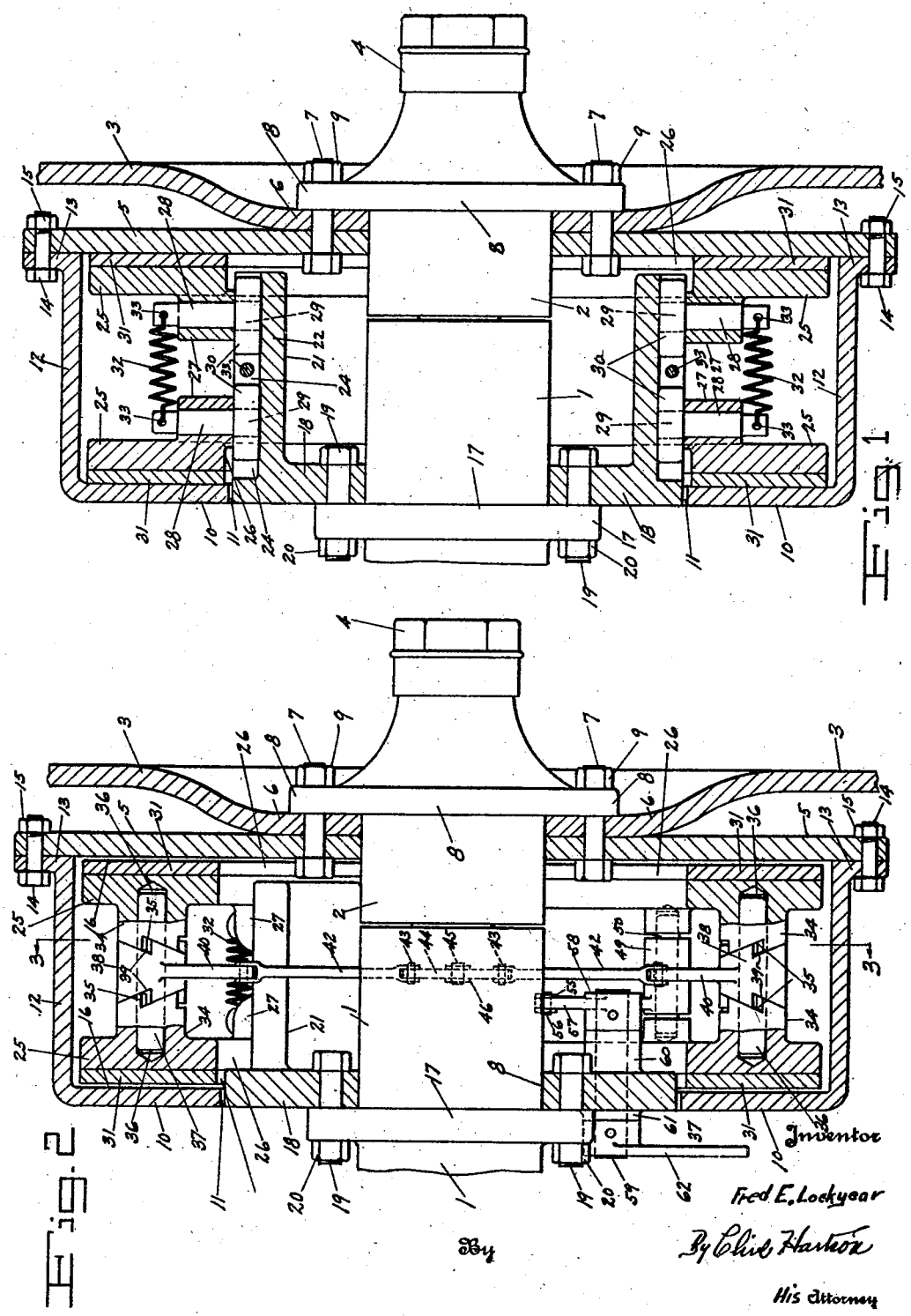
Inventor
Fred E. Lockyear
By Chib Harmon
His Attorney Feb. 16, 1932.   F. E. LOCKYEAR   1,845,505
DOUBLE DISK BRAKE
Filed May 28, 1930   2 Sheets-Sheet 2

Inventor
Fred E. Lockyear
By Clive Hartson
His Attorney

Patented Feb. 16, 1932

1,845,505

UNITED STATES PATENT OFFICE

FRED E. LOCKYEAR, OF MILWAUKIE, OREGON

DOUBLE DISK BRAKE

Application filed May 28, 1930. Serial No. 456,532.

The present invention relates to brakes designed for use on automotive vehicles, such as automobiles, trucks, and so forth. This invention makes application of two spaced brake drums or disks, the radial faces of which constitute the brake surfaces which are engaged by the brake shoes. Between the two disks are arranged two interchangeable shoes, one of which is arranged to engage one of the disks, and the other, the other. The disks are so designed that they provide a housing for the shoes and their operating mechanism. The operating mechanism contained within the brake housing, is designed to move the two shoes apart toward their respective disks. This mechanism, operated upon the cam principle, comprises but few, easily constructed and readily interchangeable parts.

Among the numerous advantages resulting from this invention may be enumerated the following:

It provides an enclosed housing for the brake members and their operating mechanism;

It provides practically double the area of brake surfaces ordinarily provided by a brake of substantially the equivalent size.

It is comparatively simple of construction and inexpensive to manufacture; and

It is susceptible of use on vehicles employing either two or four wheel brakes.

Added advantages will be perceived upon reading the specification which follows, aided by the drawings, wherein:—

Figure 1 is a cross sectional view of the invention indicated by the section line 1—1 of Figure 3.

Figure 2 is a cross sectional view of the invention indicated by the section line 2—2 of Figure 3.

Similar numerals refer to similar parts throughout the several views.

Figure 3:
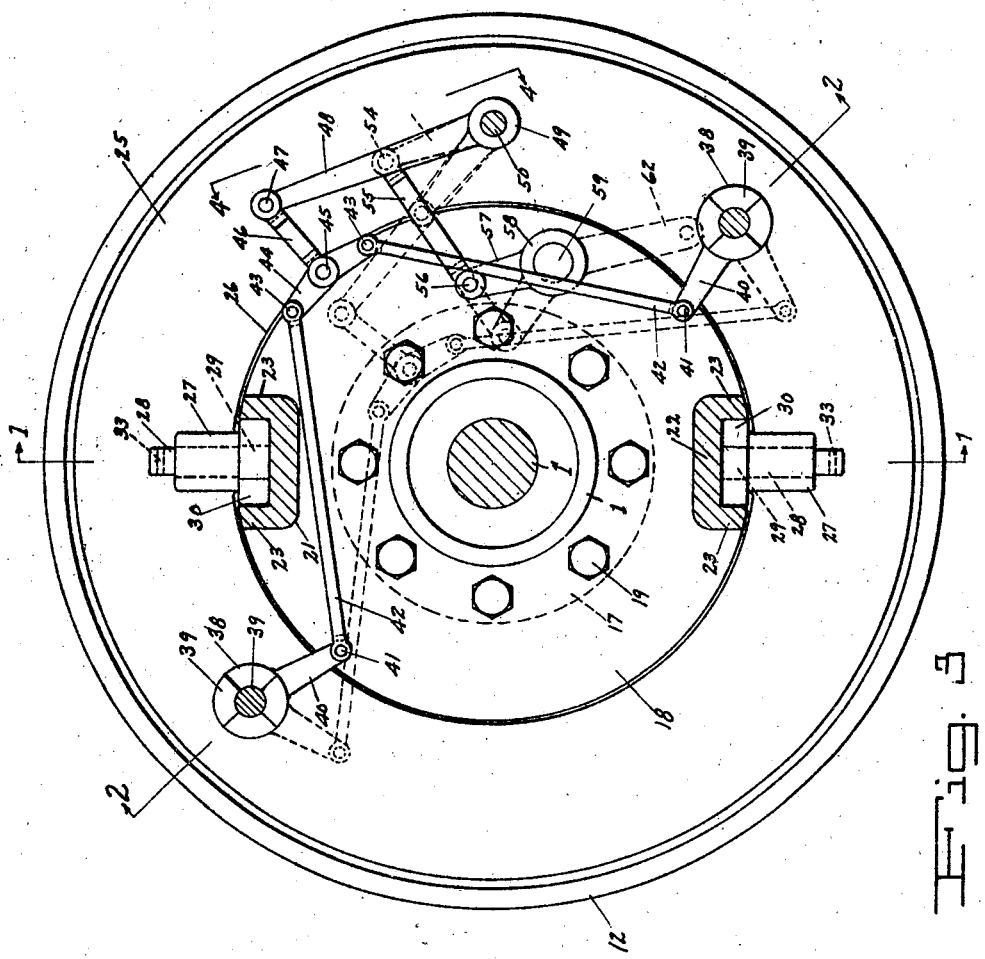
Figure 3 is a cross sectional view of the invention indicated by the section line 3—3 of Figure 2.
Figure 4:
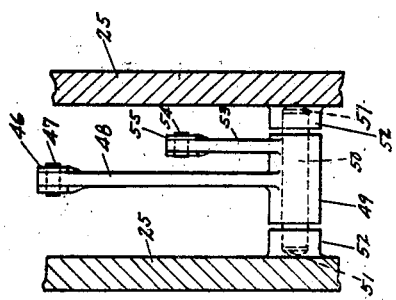
Figure 4 is a fragmentary view in partial section, and illustrates a portion of the operating mechanism of the invention.

In the drawings, a type of hub and axle construction is shown which is subject to modification to adapt the invention to different types of automotive vehicles. The construction here shown consists of a stationary axle housing member 1 having a properly designed axle 1' upon which is mounted the hub 2 of the wheel 3. As before stated, the exact construction of the foregoing elements is subject to such modification as the type of automobile or automotive vehicle shall require. The construction here adopted is purely for aiding in disclosure of the invention, and may be considered as following the usual mechanical practices in such instances, by the incorporation of proper antifriction bearings, hub cap 4, and so forth. The hub 2 is designed to carry an outer brake disk 5. The disk 5 is secured rigidly to the inturned portion 6 of the wheel by the bolts 7 which pass through the portion 6 and through the hub flange 8 and are secured in place by means of the nuts 9.

In addition to the disk 5, a second and co-operating brake disk 10 is provided. Disk 10 has a substantial central aperture 11 to allow it to revolve freely of members carried by the axle member 1. The disk 10 is carried by disk 5, and in order to aid in securing the one to the other, disk 10 is provided with a substantial axially directed flange 12 which extends toward the disk 5. Flange 12 terminates in a radially directed flange 13, which seats upon the peripheral edges of disk 5 and is secured rigidly thereto by means of bolts 14 which extend through aligned apertures in the flange 13 and the disk 5 and are secured in place by means of the nuts 15. The inner and opposing faces 16 of disks 5 and 10 are arranged parallel to one another and constitute the braking surfaces upon which the hereinafter designated shoes are designed to act.

To adequately support the braking mechanism which is located between the two disks some arrangement must be made with regard to the axle member 1 for that purpose. In this instance it is done by providing the member 1 with a peripheral flange 17. Flange 17 forms a support for the shoe support member 18 which is a disklike member provided with an enlarged central aperture to permit it to slip over the end of axle member 1. Members 17 and 18 are provided with properly designed apertures for the bolts 19 which allow the latter to be rigidly secured to the former when the nuts 20 of such bolts are threaded up. The member 18 is a disklike member, and its overall diameter is such that it may be and is seated within the aperture 11 of disk 10 and not obstruct its revolution. The member 18 constitutes the principal support for the brake shoes and their operating mechanism hereinafter described.

In order to properly support the brake shoes, the member 18 is provided with two diametrically oppositely positioned brackets 21 which are arranged at the perimeter of such disk and extend inwardly at right angles to it or parallel its axis. A cross sectional detail of the brackets 21 may be had by observing Figure 3, wherein they will each be seen to consist of a bed portion 22 having raised oppositely arranged side walls 23 in order to form a track or guideway 24. Trackways 24 are designed to act as the proximate supporting medium for the subsequently described shoes, and their purpose is to support such shoes in a manner that they may be moved into or out of engagement with disks 5 and 10.

The brake shoes consist of two identical or interchangeable apertured disks 25. The diameter of the aperture 26 is somewhat greater than the overall diameter of the shoe support member 18, and its overall diameter is slightly less than the internal diameter of the disk 10 in order that it may move freely within the space defined by the flange 12. On the inner side of each shoe is formed a projection or head 27, there being two heads on each shoe arranged diametrically opposite each other, each of which has a rounded inner contour. These heads project slightly beyond the edges of the apertures 26. Each head is bored to receive a pin 28 which has an enlarged end portion 29, too large to enter the bore and therefore projects below the head and provides a spindle for the bearing 30. Bearing 30 is a cylindrical member which may be either a single member, or if preferred, may be a cylindrical shell providing a raceway for ball or roller bearings located between it and the pin portion 29. The diameter of the member 30 is such that it may be seated or carried in the guideway 24, and constitute the supporting means for the shoes 25. This construction resists any attempt on the part of the shoes to rotate with the disks 5 or 10, and also provides a suitable support permitting the shoes to be moved to or from the disks 5 and 10. The shoes are so arranged that one engages the face 16 of disk 5 and the other engages face 16 of disk 10. To add to the frictional resistance of the shoes 25 to the movement of the brake disks, the engaging faces thereof are lined with the usual brake lining material, the nature of which is well known in the art, and in this instance the engaging faces of the shoes are provided with such lining material 31. Other than at the times the shoes are compelled to engage disks 5 and 10, it is desirable to have them recede therefrom, and this is accomplished by connecting a spring 32 between the pins 28 of the two shoes. The ends of the spring are secured in eyes 33 provided therefor in such pins, and the retraction of such spring will constantly urge the shoes to withdraw from the brake disks. Retractive movement of the shoes will cease when the members 30 engage the stop pin 33 which extends between the sides 23 of bracket 21.

The improved construction of the members supporting shoes 25 is a very important factor in the operation of a device of this character, for it is obvious that such supporting means must be so constructed that they will allow the shoes to operate at all times and under all conditions. There is a tendency on the part of the shoes to bind upon their supports during the period that they are engaging the disks. In other words, they are urged to rotate by the disks 5 and 10, and are restrained from rotating by the supporting means, the brackets 21 which are stationary with the support member 18. This will urge the shoes to bind on the brackets, thereby creating a frictional resistance to their movement toward the disks, which resistance increases proportionally to the speed of the disks. It is, therefore, necessary that some means be provided whereby the shoes will move with the least amount of frictional resistance toward their disks regardless of the speed of rotation of such disks. This resistance has been overcome in the present construction by the use of the bearing 30 heretofore referred to. In operation the bearing 30 will ride one sidewall 23 or the other of the bracket 21, according to the direction of rotation of the brake disks. In this instance the frictional resistance occasioned by binding upon the engaged side wall 23 will be overcome by the bearing 30 which will freely travel thereon.

In addition to constituting the brake disks, the members 5 and 10 provide a housing for the brake shoes and the mechanism securing their operation. This housing practically eliminates the entrance of moisture, dust and so forth into the operating mechanism and between the braking surfaces, thereby greatly lengthening the like thereof. The operating mechanism in this instance is of the cam and lever type. The opposing sides of the shoes 25 are provided with projecting cam bosses 34. There are two of such bosses on each shoe arranged diametrically opposite each other. These bosses are each provided with cam faces 35 which are identical with the exception that the faces of one boss are for right hand movement and the other for left hand movement. The bosses are provided with sockets or bearings 36 which are correspondingly arranged and are designed to receive the ends of the pins 37 which carry the cams 38. The cams 38 are provided with cam faces 39 one of which is for right hand movement and the other for left hand movement in order that it may properly engage the opposing faces 35 of the bosses 34, likewise designed for right and left hand movement. As will be readily apparent to those skilled in the art, rotation of the cams 38 in one direction will compel the shoes 25 to move apart and engage the faces 16 of the disks 5 and 10, whereas counter rotation will permit the spring 32 to disengage them from the faces 16. The cams 38 carry levers 40, in this instance integral therewith. Levers 40 are pivotally connected by pins 41 to corresponding links 42, which links in turn are pivotally connected by pins 43 to the ends of the equalizer bar 44. The mid portion of the equalizer bar 44 is connected by a pin 45 to one end of the link 46, while the other end of such link is pivotally connected by pin 47 to the lever 48 which in turn is integrally carried by the sleeve 49. Sleeve 49 is mounted upon the shaft or spindle 50. Spindle 50 floats in sockets or bearings 51 in the bosses 52 provided upon the opposing faces of the shoes 25. In order to render the shoes truly interchangeable, there should be two bosses provided upon each shoe in diametrical opposition, though but one boss is used at a time. Lever 53 is integrally secured to the sleeve 49 and this is pivotally connected by pin 54 to link 55, which link in turn is connected by pin 56 to lever 57. Lever 57 is integral with the sleeve 58 which is mounted for movement with the shaft 59. Shaft 59 extends through bosses 60 and 61 integrally formed with the shoe support member 18. There is an aperture formed in the bosses and shoe support for this purpose. One end of the shaft 50 is within the housing and carries the lever 57, and the other end is exterior of the housing and carries the lever 62 which is rigidly secured to said shaft. The lever 62 by means of the link, pins and other lever mechanisms just described transmits motion to and operates the cams 38 just described. When lever 62 is moved in one direction, the cams 38 are compelled to rotate and force the shoes 25 to engage the brake disks as heretofore described; and when the lever 62 is moved in the opposite direction, the cams are compelled to rotate in an opposite direction likewise, thereby permitting the springs 32 to withdraw the shoes from engagement with the brake disks. The lever 62 is connected with the control or operating mechanism of the vehicle, this mechanism is not shown, but may be of any well known type suitable for this purpose.

This invention may be incorporated upon vehicles using either two or four wheel brakes. In the event that these brakes are used on the fore wheels of a vehicle as well as the rear, the axle and hub construction will have to be slightly modified to accommodate them for this purpose, but this can be done without rearranging the principal parts heretofore described.

The brake so far described is to be operated manually. However it may be modified somewhat to permit it to be operated hydraulically. This can be done by connecting the hydraulic operating cylinder directly with the lever 62, or it may be incorporated in the brake itself and be connected directly or through other suitable means to the equalizer bar 44, in which event some of the operating levers and links not required may be eliminated.

Having described my invention, what I claim as being new and desire to secure by Letters Patent, is:—

1. In a brake, a pair of spaced brake disks adapted for mounting to a vehicle wheel, a pair of disk brake shoes located between said brake disks and independently thereof, a trackway supporting said brake shoes, said trackway being designed to allow said brake shoes to move apart in order to engage the opposing radial surfaces of the aforesaid brake disks; operating mechanism located between the aforesaid shoes designed to move said shoes into engagement with the aforesaid brake disks, and means for retracting said shoes when the aforesaid operating mechanism has been released.

2. In a brake, a pair of spaced brake disks adapted for mounting on a vehicle wheel, shoe brackets mounted between said disks and independently thereof, a pair of shoes carried upon said brackets, said shoes being adapted for movement to and from each other, said shoes when moved toward each other not engaging said disks, and when moved from each other engaging said disks, cam members arranged between said shoes designed when actuated in one direction to move said shoes apart, and when actuated in the opposite direction to allow such shoes to approach each other, retractive members constantly urging said shoes to approach each other, and means for actuating the cam members.

3. In a brake, a pair of spaced brake disks adapted for mounting upon a vehicle wheel, one of said disks having a substantial flange joining the rim of the other disk, shoe brackets located between said disks and independently thereof, a pair of disk shoes carried by said brackets, said shoes being positioned between the brake disks and adapted to move in opposite directions for the purpose of engaging said brake disks, means for moving said shoes into engagement with said brake disks, and means, when the last mentioned means have been released for disengaging said shoes.

4. In a brake, a pair of spaced brake disks having opposing radial faces designed to be engaged by brake shoes, a brake shoe support member independent of said disks, a pair of oppositely arranged brackets projecting from said support member, a pair of alike brake shoes carried on said brackets and positioned side by side between the aforesaid disks, said brackets allowing such shoes to move apart and engage the aforesaid disks, cam members carried by said shoes adapted when actuated to move said shoes apart for the purpose of engaging said disks, and means for actuating said cam members.

5. In a brake, a pair of spaced brake disks having opposing radial faces designed to be engaged by brake shoes, a brake shoe support member independent of said disks, a pair of oppositely arranged brackets projecting from said support member, a pair of alike brake shoes carried on said brackets and positioned side by side between the aforesaid disks, said brackets allowing such shoes to move apart and engage the aforesaid disks, a pair of oppositely arranged cam members adapted when actuated for moving said shoes apart and into engagement with said disks, means for actuating said cam members, and means incorporated in the last mentioned means for equalizing the movements of said shoes.

6. In a brake for vehicles, a pair of spaced disks forming a housing secured to and rotatable with the vehicle wheel, a pair of centrally apertured, separable brake shoes, positioned between said disks and designed when separated to frictionally engage said disks; a stationary support member, brackets on said stationary member extending through said apertures into said housing and arranged parallel the axis of said disks, said brackets being constructed to provide a guideway having a bed and two opposing side walls, heads projecting from the inner sides of said shoes and arranged in diametrical alignment with each other, a bearing journaled to each head and positioned in a guideway to enable it to ride upon one or the other of said side walls according to the direction of rotation of the aforesaid disks, and operating to resist the urge of said shoes to rotate with said disks; separators located between and carried by said shoes operable to cause such shoes to move apart and engage said disks, and a connection operable through said stationary member for actuating said separators.

FRED E. LOCKYEAR.